United States Patent [19]
Lyman et al.

[11] 3,952,602
[45] Apr. 27, 1976

[54] ROTOR BALANCING APPARATUS AND SYSTEM

[75] Inventors: Frank Lyman, Cambridge, Mass.; Joseph Lyman, Northport, N.Y.

[73] Assignee: Cambridge Thermionic Corporation, Cambridge, Mass.

[22] Filed: Mar. 3, 1971

[21] Appl. No.: 120,393

[52] U.S. Cl................................. 73/457; 73/465
[51] Int. Cl.²........................................ G01M 1/28
[58] Field of Search ............... 73/66, 462, 465, 468, 73/71.3, 504, 505, 517 B, 490 I, 457, 459; 308/10

[56] References Cited
UNITED STATES PATENTS

| | | | |
|---|---|---|---|
| 2,349,552 | 5/1944 | Holmes | 73/459 |
| 2,524,650 | 10/1950 | Cantle | 73/71.3 X |
| 2,695,165 | 11/1954 | Hansen | 308/10 UX |
| 2,712,232 | 7/1955 | Pfeiffer | 73/466 |
| 2,748,603 | 6/1956 | Wilcox | 73/465 |
| 2,919,583 | 1/1960 | Parker | 73/504 UX |
| 3,151,488 | 10/1964 | Tracy et al. | 74/573 X |
| 3,274,666 | 9/1966 | Nordsieck | 73/66 |
| 3,461,729 | 8/1969 | Haynes | 73/457 |
| 3,473,852 | 10/1969 | Lyman | 308/10 |

OTHER PUBLICATIONS
Abstract, No. 51,892, dated 11–52, ISOM.

*Primary Examiner*—James J. Gill
*Attorney, Agent, or Firm*—Roger Norman Coe; Thomas M. Ferrill, Jr.

[57] ABSTRACT

Rotor balancing apparatus and a system comprising balance probes for measuring unbalance at the ends of a magnetically suspended rotor are disclosed. Each balance probe comprises a photocell which is located in relationship to the magnetically suspended rotor such that unbalance of the rotor changes the amount of light recorded by each photocell. The signal from each photocell is electrically amplified and displayed by a suitable device, such as an oscilloscope.

8 Claims, 8 Drawing Figures

INVENTORS.
FRANK LYMAN
JOSEPH LYMAN

BY

ATTORNEY.

INVENTORS.
FRANK LYMAN
JOSEPH LYMAN

BY

ATTORNEY.

ROTOR BALANCING APPARATUS AND SYSTEM

BACKGROUND OF THE INVENTION

The invention described herein was made in the performance of work under a NASA contract and is subject to the provisions of Section 305 of the National Aeronautics & Space Act of 1958, Public Law 85–568 (72 Stat. 435; 42 U.S. 2457).

The present invention is related to magnetic suspension apparatus and more particularly, to rotor balancing apparatus and a system which can be used to measure the radial displacement at both ends of a magnetically suspended rotor simultaneously for the dynamic balancing of the rotor.

One of the important objectives in the development of magnetic journal bearings has been to produce rotor rotation as free of mechanically induced "noise" as possible. Rotational noise or perturbation can be created by a number of factors, the most common and important of which is lack of dynamic balance. In magnetic journal bearings, where no physical contact exists between rotor and stator, unbalance can cause large shaft excursions of a vibratory nature. If oscillations caused by unbalance are sufficiently large during rotation physical contact may even take place, destroying the effectiveness of such bearings. It is thus important to reduce such vibrations to the lowest possible value and this can be accomplished effectively only by balancing a magnetically suspended rotor in its own magnetic bearings.

Balancing is the process of eliminating vibrations at the bearings supporting a rotating body by altering the distribution of mass in the body. The principal causes of unbalance in rotating parts are as follows:

1. Unmachined portions of castings or forgings which, because of the process by which they are formed, cannot be made accurately concentric or symmetrical with the axis of rotation.
2. Lack of homogeneity throughout the material, whether cast, forged, rolled, formed, extruded, or otherwise produced.
3. Asymmetry of a part, brought about by limitations in design or manufacture.
4. Asymmetrical distortion of a body while running at its operating speed.
5. Variations in the distribution of mass due to manufacturing tolerances allowed on all machine surfaces.
6. Minutely bent shafts, which may be produced by pressing a rotor onto a previously finished ground shaft, or by the relief, due to aging, of any stresses that may have been located in the shaft during machining or heat treatment.
7. Accumulations of tolerances in assemblies of individually balanced components.

In order to balance a rotor during free magnetic suspension it is necessary (a) to have vibration sensors in the dynamic vibration regions of each end of the rotor's cylindrical shaft and (b) to have means for altering the mass distribution with respect to the rotational axis, independently, at each end.

Attempts to balance a rotor by standard commercial balancing techniques, such as the Gisholt techniques, and then insert the "balanced" rotor in magnetic bearings have been unsuccessful for two reasons:

i. the axis of rotation as balanced in a Gisholt machine does not necessarily coincide with the magnetically supported axis; and
ii. the sensitivity of measurement in a Gisholt machine is low due to the fact that such a machine requires auxiliary V block bearings and an additional nonrotated mass.

Because the magnetically suspended rotor is freely suspended, a shift of balance at one end has a secondary but detectable effect on the motion of the other end. This would not be true in the Gisholt technique where one end is clamped while the other end is examined. With magnetic journal bearing supports it is not ordinarily possible to clamp one end. Therefore, it has been necessary to perfect the balance at one end of the rotor, then observe the other end, and reduce the departure at each end, in turn, by a process of successive reductions.

SUMMARY OF THE INVENTION

An object of the present invention is to provide rotor balancing apparatus and a system for balancing both ends of a magnetically suspended rotor simultaneously.

Another object of the present invention is to provide rotor balancing apparatus and a system for balancing a magnetically suspended rotor in its own bearing system.

Still another object of the present invention is to provide rotor balancing apparatus and a system for balancing a magnetically suspended rotor turning in its own bearing system at a relatively high rotational velocity.

yet another object of the present invention is to provide rotor balancing apparatus and a system for quickly and accurately determining the extent and location of any unbalance in a magnetically suspended rotor.

In accordance with the present invention, a balance probe comprising a photocell is located at each end of a magnetically suspended rotor. The amount of illumination transmitted to each photocell is made to depend on the balance of the rotor and unbalance of the rotor during its revolutions causes variation in the amount of light introduced to the photocell of each balance probe. By electrically amplifying the signal from each photocell, both the extent and location of the unbalance is obtained and can be displayed by suitable means, as by means of an oscilloscope. Once the extent and location of unbalance is known, the distribution of mass on the rotor can be altered such that balancing is accomplished.

BRIEF DESCRIPTION OF THE DRAWINGS

Other and further objects, advantages, and features of the invention will be apparent to those skilled in the art from the following detailed description thereof, taken in conjunction with the accompanying drawings, in which.

DESCRIPTION OF THE PREFERRED EMBODIMENTS

Figure 1:
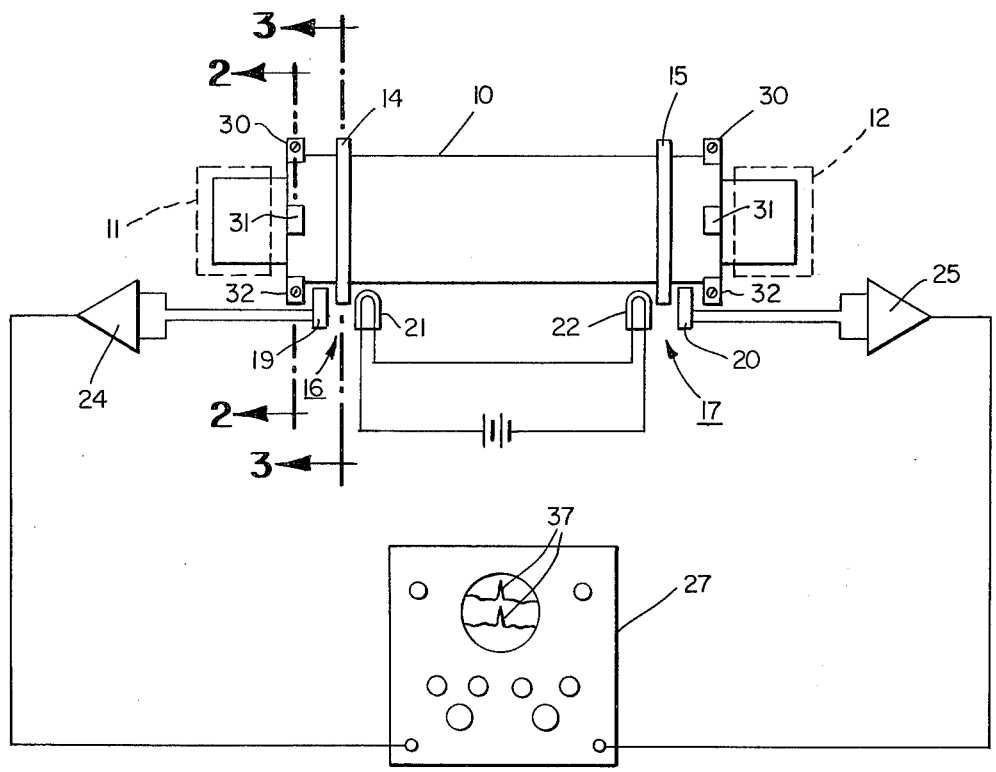
FIG. 1 is a highly schematic drawing of an embodiment of the invention with the magnetic bearings being shown in phantom outline.

A preferred embodiment of the present invention is illustrated in FIG. 1. In this drawing a rigid body 10, such as a cylinder, is suspended between two magnetic bearings 11 and 12, shown in phantom outline. The means for suspending the rotor in the magnetic bearings can be that described in U.S. Pat. Nos. 3,428,371; 3,473,852; 3,490,816; and 3,565,495. Balance rings 14 and 15 are located near each end of rotor 10. Two balance probes 16 and 17 comprising, respectively, photocells 19 and 20 and lamps 21 and 22, are so located in relationship to balance rings 14 and 15 that the shadow of each balance ring covers about one-half of the surface of photocells 19 and 20.

High gain d-c amplifiers 24 and 25 are connected to each photocell and, when lamps 21 and 22 are illuminated, a reverse d-c voltage is applied at the amplifier inputs to cancel out the d-c voltage from the photocells. The output of amplifiers 24 and 25 is connected to a dual trace oscilloscope 27 such that the signal from photocell 19 and amplifier 24 is displayed on one channel and the signal from photocell 20 and amplifier 25 is displayed on the other channel.

Figure 2:
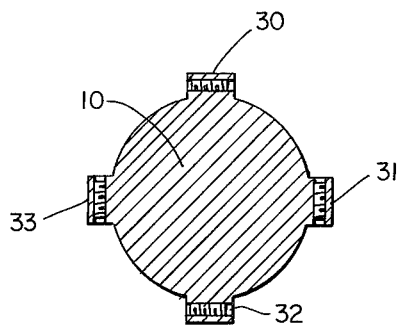
FIG. 2 is a cross sectional view of the end portion of the rotor, taken along line 2—2 of FIG. 1.
Figure 3:
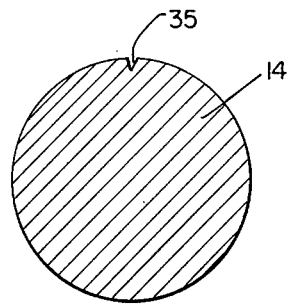
FIG. 3 is a cross sectional view of a balance ring, taken along line 3—3 of FIG. 1.

As illustrated in FIG. 2 four tangential balance screws 30, 31, 32 and 33 are located at the end of rotor 10. It will be understood that identical balance screws are also present at the other end of rotor 10. FIG. 3 is a cross-sectional view of balance ring 14 illustrating a reference indentation 35. A similar reference indentation is also present on balance ring 15.

Since magnetic bearings 11 and 12 have virtually no friction, rotor 10 will always come to rest with its heavy "side" down. For example, if the rotor comes to rest with balance screw 32 (FIGS. 1 and 2) in the down position, then balance screw 32 is on the heavy side and balance screws 31 and 33 can be moved up toward balance screw 30 to accomplish static balancing. A similar adjustment is then made at the opposite end of rotor 10. After making these adjustments, rotor 10 is rotated slightly and its point of rest noted. As the point of rest changes, appropriate balance screw adjustments are made until rotor 10 has no definite resting point or until rotor 10 rotates for a relatively long period of time before coming to rest. When the rotor no longer has a definite resting point static or force unbalance, i.e., the unbalance present when the center of gravity of a body does not lie on the rotational axis, is eliminated.

It is next necessary to overcome the moment or couple unbalance which occurs when the principal inertia axis of a body forms an angle with the rotational axis. If not restrained, the rotating body with moment unbalance will rotate about a principal axis and, in effect, generate intersecting cones with the rotational axis. To obtain the desired dynamic balancing, rotor 10 is accelerated slowly and the trace appearing an oscilloscope 27 from the signals obtained from photocells 19 and 20 is noted. At slow speeds this trace is more or less a straight line with sharp upward peaks, represented by 37 in FIG. 1, corresponding to the reference or fiducial indentations on balance rings 14 and 15. These upward peaks occur once every revolution. As the number of revolutions per minute for rotor 10 is increased, the oscilloscope tracing begins to change and the trace begins to have highs and lows; normally, one high and one low appearing between each reference peak. The sinusoidal trace on the screen of the cathode ray oscilloscope indicates both the magnitude and the angular location of the required correction. Amplitude of the sinusoidal trace is an effective measure of the required amount of correction, while the position of the crest on the wave indicates the angular location. A high indicates that the rotor is light while a low indicates that the rotor is heavy at a particular location. Accordingly, the heavy location on the rotor can be determined accurately by reference to the sharp upward peaks 37 appearing on the oscilloscope.

A rotor can thus be both statically and dynamically balanced. The method of the present invention, utilizing photocells to measure the radial displacement at each end of the rotor simultaneously, preferably employs independent light sources to activate the photocells which are partially shadowed by the annular rings installed at the ends of the rotor. Obviously, the same light source could be used. In the illustrated preferred embodiment of FIG. 1 it is found that a signal level of approximately 4 volts per 0.01 inch (0.4 millivolt per microinch) permits measurement of dynamically induced displacement of very small magnitude. In the same embodiment, a reference or fiducial indentation produced by a 0.015 inch deep nick in the balance ring is used.

Obviously, various means can be employed for correcting unbalance and substituted for the two sets of four balance screws symmetrically arranged in the embodiment illustrated by FIGS. 1 and 2. When starting the balancing procedure, putty balancing weights which simply stick to the rotor can be used for obtaining a crude initial balance. Centrifugal force will throw the putty off when the rotor is operated at higher speeds, and therefore the use of such putty can only be regarded as an initial convenience. Although the most preferred method of altering the distribution of mass in a rotor is by the addition of weight, corrections for balance can be made by either the addition or removal of weight. Common methods of applying correction by removing weight include milling, grinding, shaping and drilling.

Since compliance of the magnetic support itself is used to give the degree of freedom necessary for unbalance detection and measurement, there is no "unsprung" weight involved — a situation radically different from conventional balancing techniques. In addition, when balance is obtained there can be little question as to whether rotation is taking place with respect to the magnetic or physical center of rotation.

Since a magnetic support mechanism can be thought of as if it were a spring system, this effectively means that due to the mass of the supported rotor there will be resonances during rotation. Resonance peaks greatly amplify any unbalance and therefore it is desirable to conduct all balancing at such peaks. In accordance with the present invention, and in contrast to conventional balancing means, balancing can be conducted at reasonance peaks. The balance achievable by the procedure of the present invention can be less than 3 to 4 microinches of motion at either end of the shaft thereby making it possible to obtain exceptionally "noise-free" rotation. The balancing system of the present invention, employing lamps and photocells to detect radial displacement of the magnetically suspended rotor while rotating, has successfully permitted a magnetically suspended rotor of about 3 inches in diameter to operate at speeds in excess of 12,500 revolutions per minute (rpm).

Figure 4:
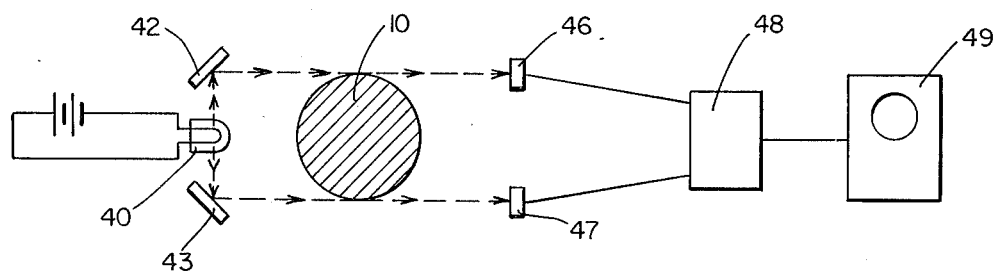
FIGS. 4 – 6 are highly schematic drawings showing different balance probe embodiments of the invention wherein a balance ring, such as that illustrated in FIG. 3 is not required.
Figure 5:
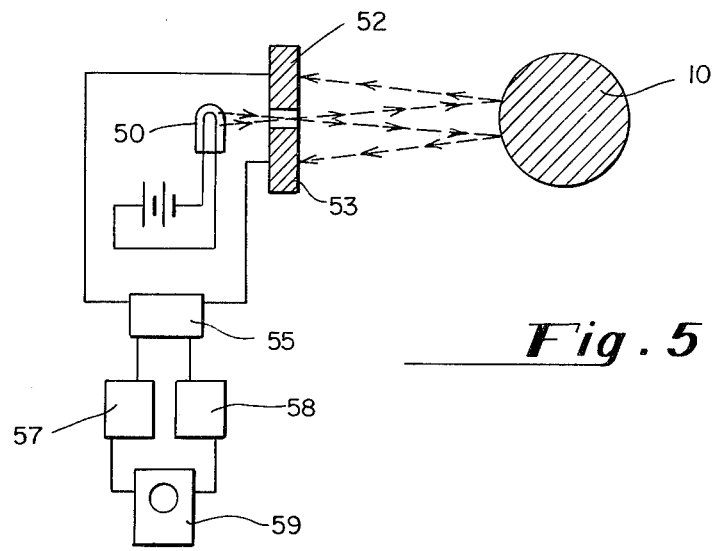
Figure 6:
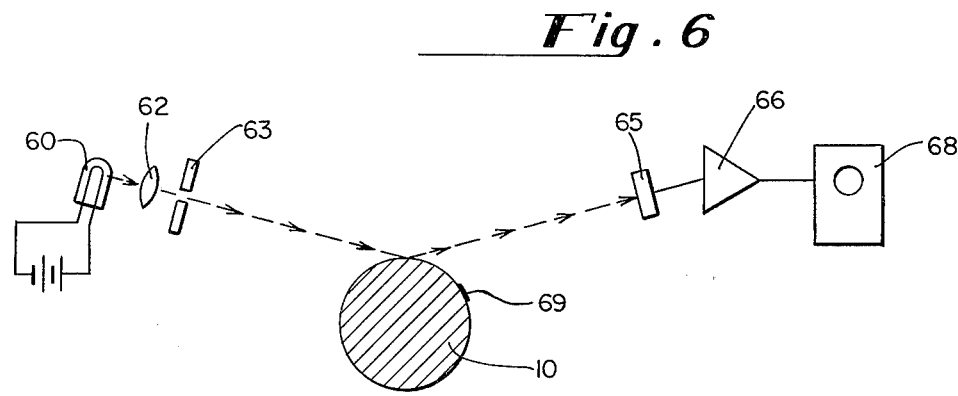

FIGS. 4 to 6 illustrate alternative embodiments of the present invention which do not require the presence of a reference ring. In FIG. 4 a single light source 40 is employed to reflect light from surfaces 42 and 43 across two surfaces of rotor 10, which is shown in cross section. The amount of light reflecting from surfaces 42 and 43 is determined by photocells 46 and 47, respectively, the signals from photocells 46 and 47 are then amplified at 48. The amplified signals are displayed on oscilloscope 49 in a manner similar to that described in connection with FIG. 1.

In FIG. 5 light from source 50 is reflected off of the surface of rotor 10, shown in cross section, back to photocells 52 and 53. The signals from these photocells are separately amplified at 55. The amplified signals are measured by means of voltmeters 57 and 58 and are displayed on oscilloscope 59.

The embodiment illustrated in FIG. 6, like the embodiment of FIG. 5, relies upon light reflected from the surface of the rotor for balancing the rotor. Light from source 60 passes through lens 62 and diaphram 63 and after striking the surface of rotor 10, shown in cross section, is reflected to photocell 65. The signal from this photocell is amplified by amplifier 66 and the amplified signal is displayed on oscilloscope 68. A suitable mark, such as a paint strip 69, can be used as a reference mark, in connection with this embodiment.

Figure 7:
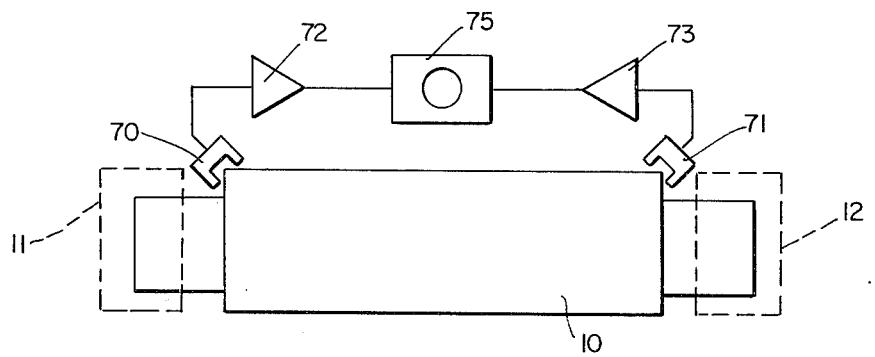
FIG. 7 is a highly schematic drawing of an embodiment of the invention in which each end of the magnetically suspended rotor is used in conjunction with a balance probe.

In the embodiment illustrated by FIG. 7, rotor 10 is suspended between magnetic bearings 11 and 12, shown in phantom outline. The balance probes, 70 and 71, are so arranged with respect to rotor 10 as to use the end of the rotor as a means for varying the signals transmitted from the balance probes to their amplifiers 72 and 73, respectively. The amplified signals can be observed in the usual manner by means of oscilloscope 75.

Figure 8:
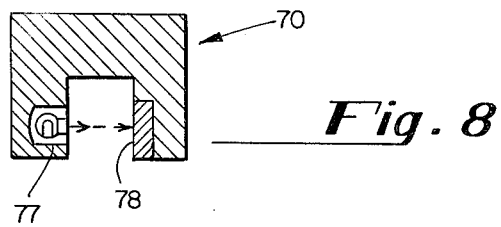
FIG. 8 is a cross sectional view of one of the balance probes shown in FIG. 7.

FIG. 8 is a cross sectional view of the balance probe 70 and illustrates the light source 77 and photocell 78 of the probe. It will be seen that any obstruction to the transmitted light, such as the end portion of rotor 10, will cause at least partial shadow with respect to photocell 78 and thereby vary the signal obtained from the photocell.

While the present invention has particular applicability for balancing magnetically suspended rotors, used for example in gyros and ultracentrifuges, the invention can also be used for balancing rotors which are not magnetically suspended, such as rotors supported by conventional bearings.

From the foregoing, it will be seen that this invention is well adapted to obtain all of the ends and objects hereinabove set forth, together with other advantages which are obvious and which are inherent to the system. Extremely high sensitivity of measurement and hence corrective ability can be achieved because:

a. the vibration of the rotor can be completed isolated from all other appendages or masses;
b. operation at resonance permits great amplification of the observed unbalance signal; and
c. the rotor is balanced in the exact bearing in which it is used, thus insuring precise alignment for rotational and magnetic axes.

Obviously, many other modifications and variations of the invention as hereinbefore set forth may be made without departing from the spirit and scope thereof.

What is claimed is:

1. Balancing apparatus comprising:

an elongated movable object having a longitudinal axis and a fiducial mark applied to said movable object as a standard for measuring the radial variations of relative movement, magnetic bearing means at opposite ends of said movable object for magnetically suspending the movable object, means for rotating the movable object about its longitudinal axis, each said magnetic bearing means constituting a stator portion spaced apart from the rotor portion of the elongated movable object such that a space gap exists between the stator and rotor portions through which magnetic lines of force extend, said apparatus being characterized by the fact that mass asymmetry of said movable object about said longitudinal axis tends to cause variations in the space gaps of said magnetic bearing means during rotation of said movable object, said apparatus further including means for detecting unbalance in said rotor, said means comprising a probe in the vicinity of at least one end of said movable object for detecting radial variations of movement thereof relative to the stator portions of said magnetic bearing means, said probe being fixedly positioned relative to the stators of said magnetic bearing means and being free from physical contact with said movable object, and means responsive to said probe for indicating the radial variations of relative movement within said magnetic bearing means during the revolution of said movable object.

2. The balancing apparatus of claim 1 wherein the fiducial mark is painted on the movable object.

3. The balancing apparatus of claim 1 wherein the fiducial mark is an indentation on the movable object.

4. The balancing apparatus of claim 1 wherein the movable object contains symmetrically spaced screws for correcting unbalance of the movable object.

5. The balancing apparatus of claim 4 wherein the screws are present at each end of the movable object.

6. The balancing apparatus of claim 1 wherein probes are present at each end of the magnetically suspended movable object.

7. The balancing apparatus of claim 1 which further contains an oscilloscope as the means for indicating the radial variations of relative movement.

8. The balancing apparatus of claim 7 wherein the oscilloscope is a dual trace oscilloscope.

* * * * *